United States Patent [19]

Dischert

[11] Patent Number: 5,260,773
[45] Date of Patent: Nov. 9, 1993

[54] COLOR ALTERNATING 3-DIMENSIONAL TV SYSTEM

[75] Inventor: Lee Dischert, Medford, N.J.

[73] Assignee: Matsushita Electric Corporation of America, Secaucus, N.J.

[21] Appl. No.: 771,498

[22] Filed: Oct. 4, 1991

[51] Int. Cl.⁵ .......................................... H04N 15/00
[52] U.S. Cl. ................................................ 358/3
[58] Field of Search ..................... 358/3, 88, 91, 92

[56] References Cited

U.S. PATENT DOCUMENTS

| | | | |
|---|---|---|---|
| 3,251,933 | 5/1966 | Beste | 178/6.5 |
| 3,275,745 | 12/1963 | Var | 178/6.5 |
| 3,604,839 | 9/1971 | Kitsopoulos | 358/3 |
| 3,626,404 | 12/1971 | Ophir et al. | 340/324 A |
| 4,214,257 | 7/1980 | Yamauchi | 358/3 |
| 4,399,456 | 8/1983 | Zalm | 358/9 |
| 4,480,623 | 10/1984 | van Merode | 358/3 |
| 4,523,226 | 6/1985 | Lipton et al. | 358/91 |
| 4,567,513 | 1/1986 | Imsand | 358/92 |
| 4,641,178 | 2/1987 | Street | 358/3 |
| 4,658,291 | 4/1987 | Morishita | 358/3 |
| 4,719,482 | 1/1988 | Hora | 350/91 |
| 4,734,756 | 3/1988 | Butterfield et al. | 358/88 |
| 4,739,418 | 4/1988 | Iwahara et al. | 358/88 |
| 4,994,898 | 2/1991 | Ling et al. | 358/3 |
| 5,084,763 | 1/1992 | Naradate et al. | 358/3 |

OTHER PUBLICATIONS

S. Herman, "Principles of Binocular 3D Displays with Applications to Television", Journal of SMPTE, vol. 80 Jul. 1971.

A. N. Brinson et al., "Liquid Crystal Apparatus for Converting Black and White CRT Display Into Colored Display", IBM Technical Disc. Bull., vol. 22 No. 5, Oct. 1979.

Spec. Sheet for Ikegarii 3D Camera System, LK-33, Feb. 1991.

Primary Examiner—Mark R. Powell
Attorney, Agent, or Firm—Ratner & Prestia

[57] ABSTRACT

A 3-dimensional color television system in which left and right images are always displayed simultaneously and where the colors of each of the left and right images are alternately switched.

13 Claims, 7 Drawing Sheets

LEFT/RIGHT MULTIPLEXER 40

COLOR ALTERNATING 3-DIMENSIONAL TV SYSTEM

BACKGROUND OF THE INVENTION

1. Field of the Invention

This invention relates to a method and apparatus for sending and producing stereoscopic (3-dimensional) television images.

2. Description of the Related Art

Several three-dimensional television picture display systems are described in the periodical "Journal of the SMPTE", July 1971, pages 539 to 544, which is hereby incorporated by reference. One system utilizes shutters that allow a "left eye image" and a "right eye image" to be alternately displayed on a display device. The right eye image is polarized in one direction and the left eye image is polarized in the other direction. The images alternate at approximately 60 cycles a second so that, using glasses having analyzer lenses, each eye sees alternate ones of the displayed images. While this does present a picture that appears to be 3-dimensional, the alternating images produce a flickering effect which is difficult to view and does not produce an optimum picture. The rate of alternation (frame rate) can be increased to reduce the flicker, however, this requires more bandwidth and/or higher scanning rates, thereby increasing the complexity and cost of the system.

An alternative system is described in U.S. Pat. No. 4,480,263 entitled THREE-DIMENSIONAL TELEVISION SYSTEM AND TRANSMITTER SUITABLE THEREFOR, which is hereby incorporated by reference. This system uses color to separate the left and right images. In this system, first and second pick-up devices for recording a scene from different positions are used. A picture display device displays, in two different colors, information intended for the left and right eyes, respectively. When the overall picture is observed with two eyes through glasses having lenses of different colors, a 3-dimensional image results. The problem with this system is that the left and right images have different colors and brightnesses and, thus, are annoying to the viewer. This system also results in poor color perception.

SUMMARY OF THE INVENTION

It is an object of the present invention to provide a 3-dimensional color television system which reduces the annoyance caused by different colors and brightnesses in each eye, and which reduces the flickering of images caused by the alternating left/right viewing systems of prior systems.

According to the present invention, there is disclosed a 3-dimensional television system comprising pick-up means for receiving separate left and right images of an object or scene; control means for alternating the color of each left and right image so that, in odd numbered frames, the left image is of a first color or color group and the right image is of a second color or color group, and in even numbered frames the left image is of said second color or color group and said right image is of said first color or color group; multiplexing means for combining the separate left and right color images into one signal; transmission means for transmitting, frame by frame, said left and right multiplexed images; receiving means for receiving said transmitted signal; demultiplexing means for demultiplexing the left and right images; display means for displaying the demultiplexed left and right images; and control means for controlling the display of the left and right demultiplexed images so that a viewer's left and right eyes view the respective left and right images simultaneously and substantially exclusively.

DESCRIPTION OF THE PREFERRED EMBODIMENTS

The basic system of the present invention utilizes a two-view pick-up device, a left/right multiplexer, a transmission system including channel encoding, transmission channel and channel decoding, a left/right demultiplexer and a viewer or display for 3-dimensional viewing.

Figure 1:
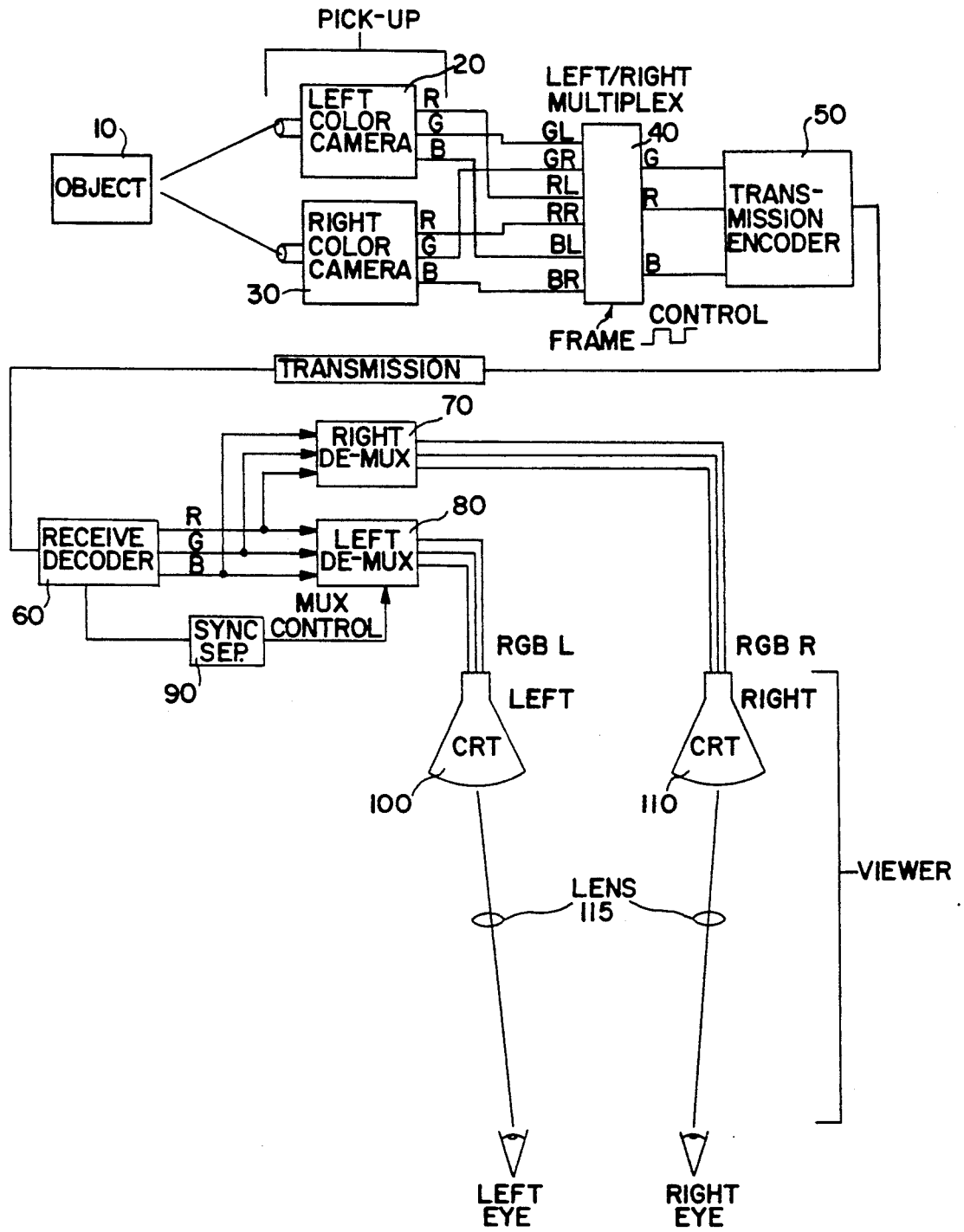
FIGS. 1 and 1a are block diagrams of a 3-dimensional color television system according to the present invention.

As shown in FIG. 1, an object 10 is scanned by left camera 20 and right camera 30. Left camera 20 produces three color signals GL, RL and BL corresponding to the green, red and blue light components, respectively, contained in the light coming from the scene in which the object is placed. Similarly, right camera 30 produces three signals GR, RR, and BR. The green, red and blue components from both cameras are combined by left/right multiplexer 40 into three separate signals, G, R and B.

Figure 1A:
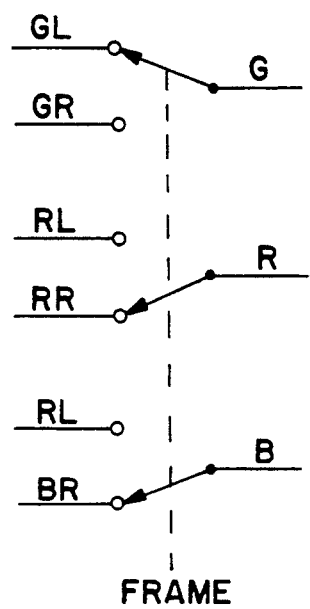

Circuitry suitable for use as the multiplexer 40 is shown in FIG. 1a. As shown, the multiplexer 40 is controlled by a signal FRAME. This is a 30 Hz signal which changes state at the end of each field of the signals provided by the cameras 20 and 30. This signal may be generated from the vertical synchronizing signals provided to the cameras 20 and 30. In response to this signal, the multiplexer 40 alternately provides the signals GL, RR and BR and the signals GR, RL and BL as the respective signals G, R and B during successive field intervals. In the exemplary embodiment of the invention, the signals GL, RR and BR are passed during odd numbered fields and the signals GR, RL and BL are passed during even numbered fields.

The two color groups consisting of green on one hand and red and blue on the other hand are chosen because they contain approximately the same amount of luminance information. This may be seen from the well known equation (1) which defines luminance, Y, in terms of the red (R), green (G) and blue (B) signals.

$$Y = 0.30\,R + 0.59\,G + 0.11\,B \qquad (1)$$

According to this equation, the green signal contains 59 percent of the luminance information and the combined red and blue signals contain the other 41 percent. The combination of red and blue is commonly referred to as magenta.

These signals are provided to transmission encoder 50 which may, for example, encode the signal according to one of the broadcast standards (i.e. NTSC, PAL or SECAM) into a composite video signal, and then transmit the encoded signal. This signal is received by receive decoder 60. Decoder 60 may include, for example, conventional television receiver circuitry. This decoder separates the red, green and blue signals from the received composite video signals and applies these signals to respective right and left demultiplexers 70 and 80. Alternatively, the transmitted signal may be the separate red, green and blue signal components provided by the multiplexer 40 which are provided directly to the demultiplexers 70 and 80.

Demultiplexers 70 and 80 provide decoded signals representing the respective left and right images, of the green, red and blue signals, with the colors produced by each demultiplexer being controlled by synchronization separator 90. The output terminals of the left demultiplexer 80 are coupled to a left display device 100 and the output terminals of the right demultiplexer 70 are coupled to a right display device 110.

The synchronization separator 90 may be responsive to the equalizing pulses which occur in the vertical blanking interval of the received composite video signal to produce a control signal which is in one state during odd field intervals and in an opposite state during even field intervals. This signal controls the right and left demultiplexers 70 and 80 to provide alternate color signals during alternate field intervals.

A key principle of the present invention is that a left image and a right image are always displayed, i.e., neither image is ever completely blanked. According to this scheme, there is no alternation between left and right images, since the left and right images are continuously and simultaneously displayed. In contrast to the prior art, however, this embodiment of the invention switches the colors of each of the left and right images during successive fields, so that for example, predesignated "A" colors (e.g. red and blue or magenta) and predesignated "B" colors (e.g. green) are alternately displayed as discussed below.

Synchronization separator 90 controls the demultiplexers 70 and 80 so that, for example, in one frame the right CRT receives only the "A" color images from the right camera and the left CRT receives only the "B" color images from the left camera, and then, in the next field interval, the right CRT receives only the "B" color images from the right camera and the left CRT receives only the "A" color images from the left camera.

Because the eye/brain is less susceptible to color flicker than to luminance flicker and because the amount of luminance in each of the "A" and "B" color images is approximately equal (i.e. $0.59 \approx 0.41$), there is no need for a higher frame rate to decrease the flickering effect as is needed in prior art systems. Thus, in contrast to prior art alternate display systems which display only the left eye or right eye image at any one time, the present invention always displays both right and left eye images simultaneously.

The images from the CRT's 100 and 110 can be optically converged by a number of well known methods, for example, by beam splitters, prismatic glasses or a stereoscopic viewer including lenses 115, so that the viewer sees a converged image.

Figure 1B:
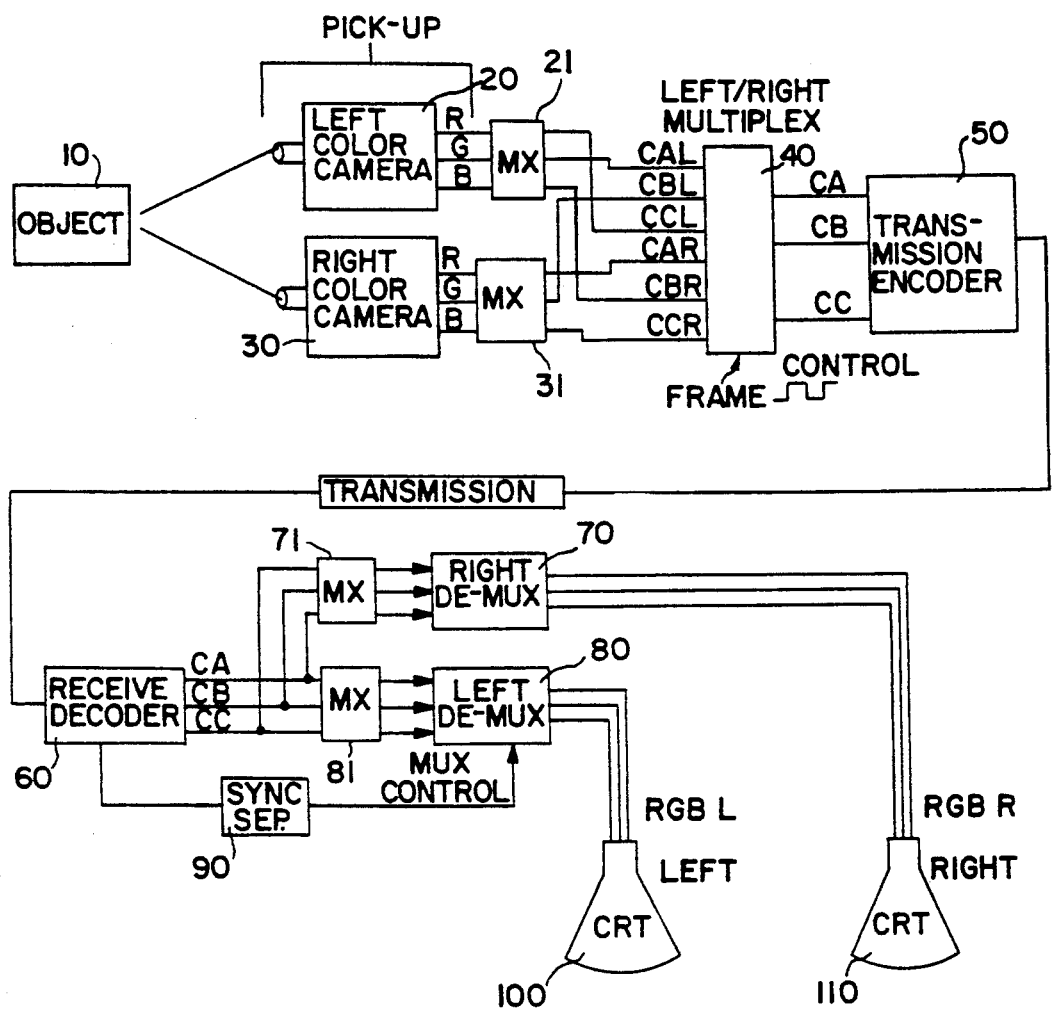
FIG. 1b is a block diagram illustrating a modification of the color television system shown in FIGS. 1a and 1b.

While the embodiment of the invention described above uses alternating green and magenta images which have approximately equal luminance values, it is contemplated that the system may be modified to display images of different colors having more equal luminance values. A system of this type is shown in FIG. 1b. This system is identical to the system shown in FIG. 1 except for the addition of four matrix circuits 21, 31, 71 and 81. The matrix circuits 21 and 31 convert the red, green and blue signals provided by the respective cameras 20 and 30 into three new color signals, CA, CB and CC. Exemplary signals may be generated, for example, by a matrix circuit which, in phasor terminology, defines the color signal CA as a vector which is offset by an angle $\alpha$ from the green color signal vector in a direction toward the blue color signal vector. The signals CB and CC are similarly defined as being offset by the same angle from the red and blue color signal vectors, respectively.

In addition to the matrixes 21 and 22, it may be desirable to modify a matrix (not shown) in the transmission encoder circuit 50 to properly encode the signals CA, CB and CC into a luminance signal Y.

The receive decoder 60, which may also include a modified matrix (not shown), recovers the signals CA, CB and CC from the received video signal. The matrices 71 and 81 then translate the signals CA, CB and CC into red, green and blue signals which are applied to the CRT's 100 and 110. The colors displayed are represented by the vector CA on the one hand and the combination of the vectors CB and CC on the other hand. If the vectors CA, CB and CC are chosen properly, the alternating white or polychromatic images displayed by this embodiment of the invention, on the average, will have substantially equal levels of luminance.

Figure 2:
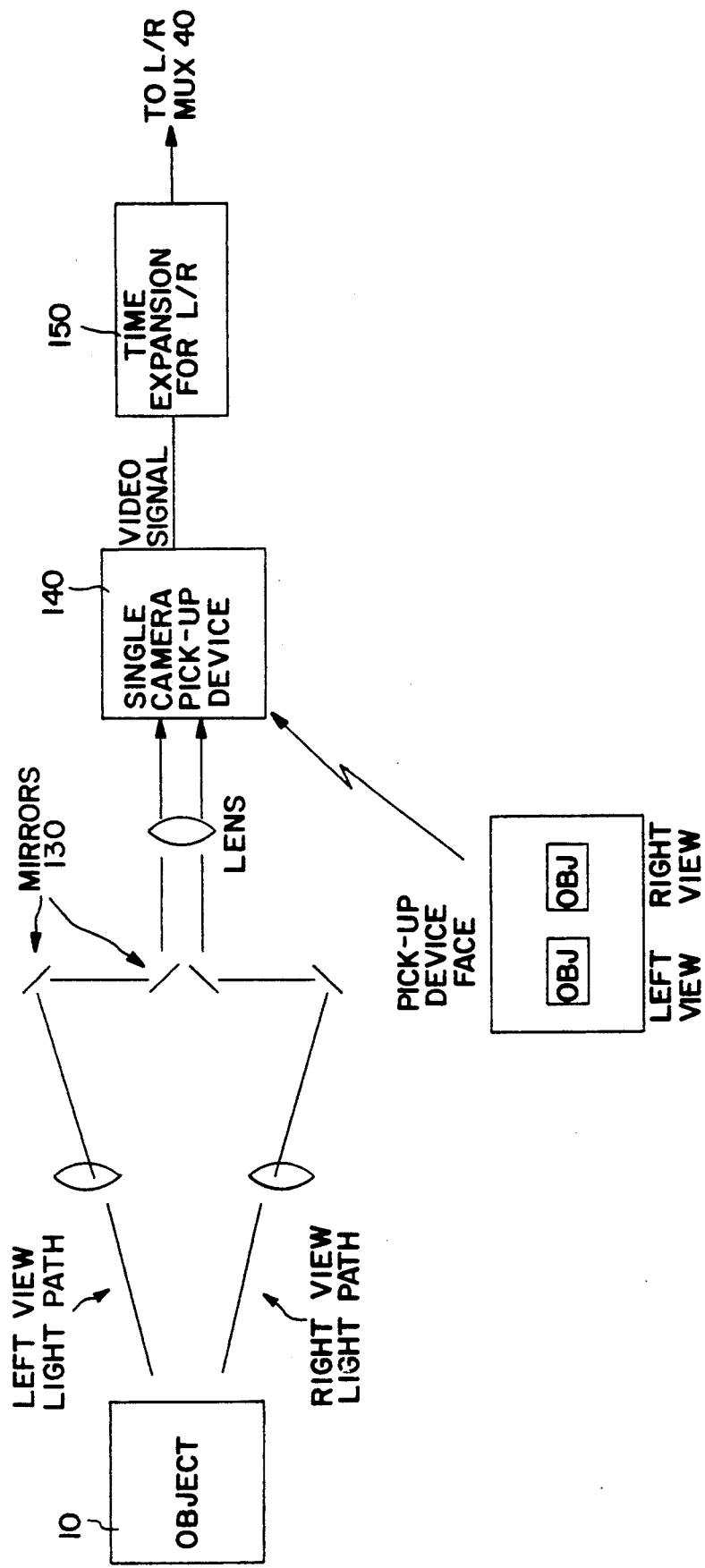
FIG. 2 is a block diagram of a second embodiment of a 3-dimensional color television system according to the present invention.

FIGS. 2-6 illustrate variations of the concept described above with respect to FIGS. 1 through 1b. FIG. 2 shows an alternate embodiment of the invention which uses a single-display device having a time division multiplexed pick-up. Mirrors 130 direct two different views of the object 10 to a single camera pick-up device 140. A left view and a right view, spatially separated, are received by the single camera pick-up device and are transmitted, through a time expansion circuit 150, to the left/right multiplexer 40 of FIG. 1. The rest of the circuit operates as described above with respect to FIG. 1.

Because the left and right images are side-by-side, they are compressed in time when they are scanned out of the pickup device 140. The time expansion circuitry 150 expands the signals in time so that they may be scanned at the same time to overlap spatially. The time expansion circuitry 150 may include, for example, a buffering delay device such as a CCD or digital memory and interpolation circuitry which provides missing pixel values when each of the two images are expanded in time from the buffer.

Figure 3:
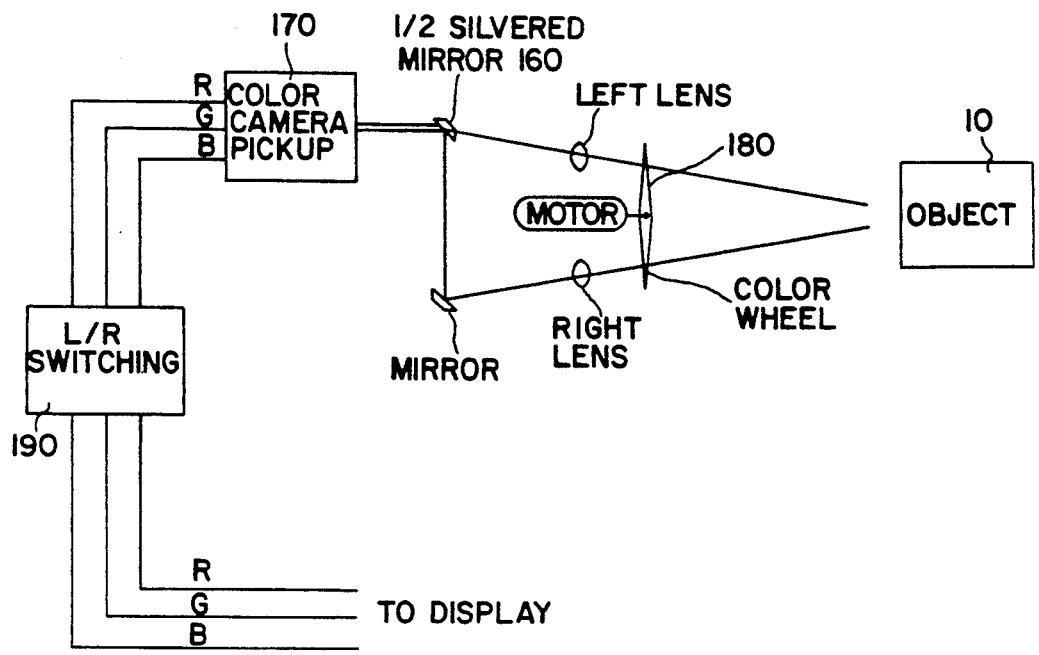
FIG. 3 is a block diagram of a third embodiment of a 3-dimensional color television system according to the present invention.

FIG. 3 illustrates a third embodiment in which the left/right multiplexing is done mechanically rather than electronically. A half silvered mirror 160 allows both a direct view of the object 10 and an alternate view from a different angle to be reflected back to the color camera pick-up 170. Color wheel 180 is divided in half, having different colors (e.g. green and magenta) on opposite sides. Each cycle, the left view is viewed by the camera 170 one-half of the time through one color filter, and the other one-half of the time through the other color filter. The right view is viewed by the camera 170 in a similar, though inverse, manner. Since there is always at least one color being viewed by each lens, there is not a "blanking" period during which one lens sees nothing. This helps in alleviating the flicker problem previously mentioned.

The camera 170 receives the optically multiplexed signal, and it is sent to the channel encoding or display device directly. The signal is then processed or displayed in a manner similar to that of the circuit of FIG. 1. In this embodiment of the invention, however, the multiplexer 40 of FIG. 1 is not needed since the two images have been mechanically multiplexed as set forth above.

Figure 4:
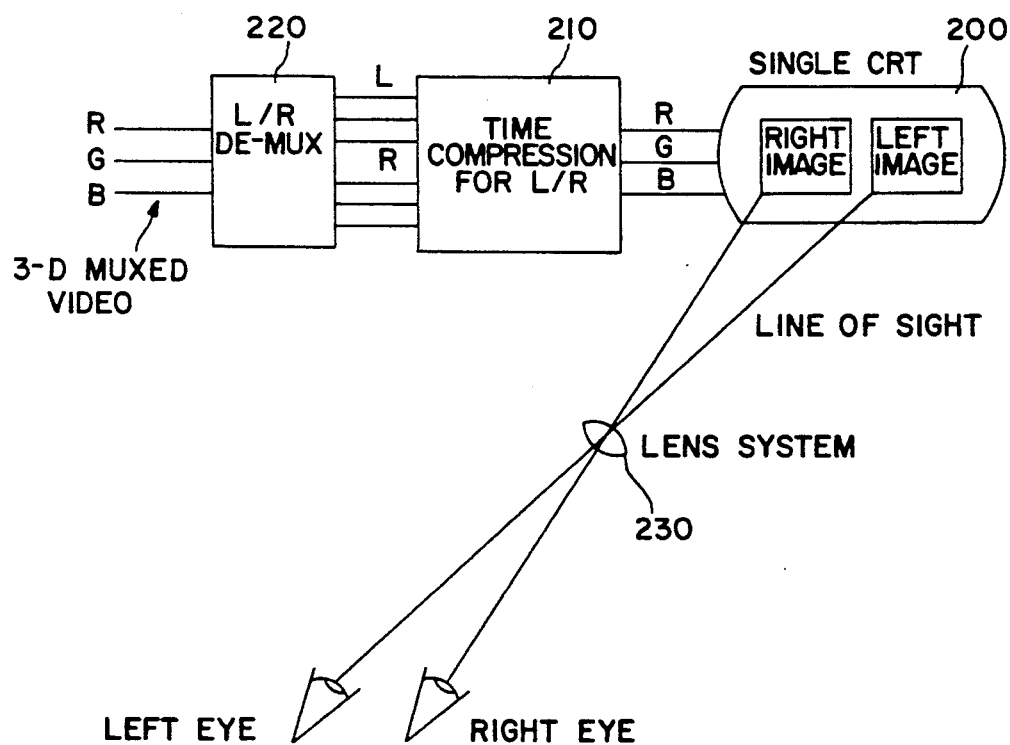
FIG. 4 is a block diagram of a fourth embodiment of a 3-dimensional color television system according to the present invention.

FIG. 4 illustrates a time division multiplexed viewer utilizing a single CRT display with two separated images. In this arrangement, the display device 200 simultaneously displays spatially separated left and right images. As with the prior examples, the colors for the left and right images are alternated via L/R demultiplexer 220. The images themselves are converged by an optical device 230, which can comprise, for example, a lens or a series of lenses to produce a single stereoscopic image.

Figure 5:
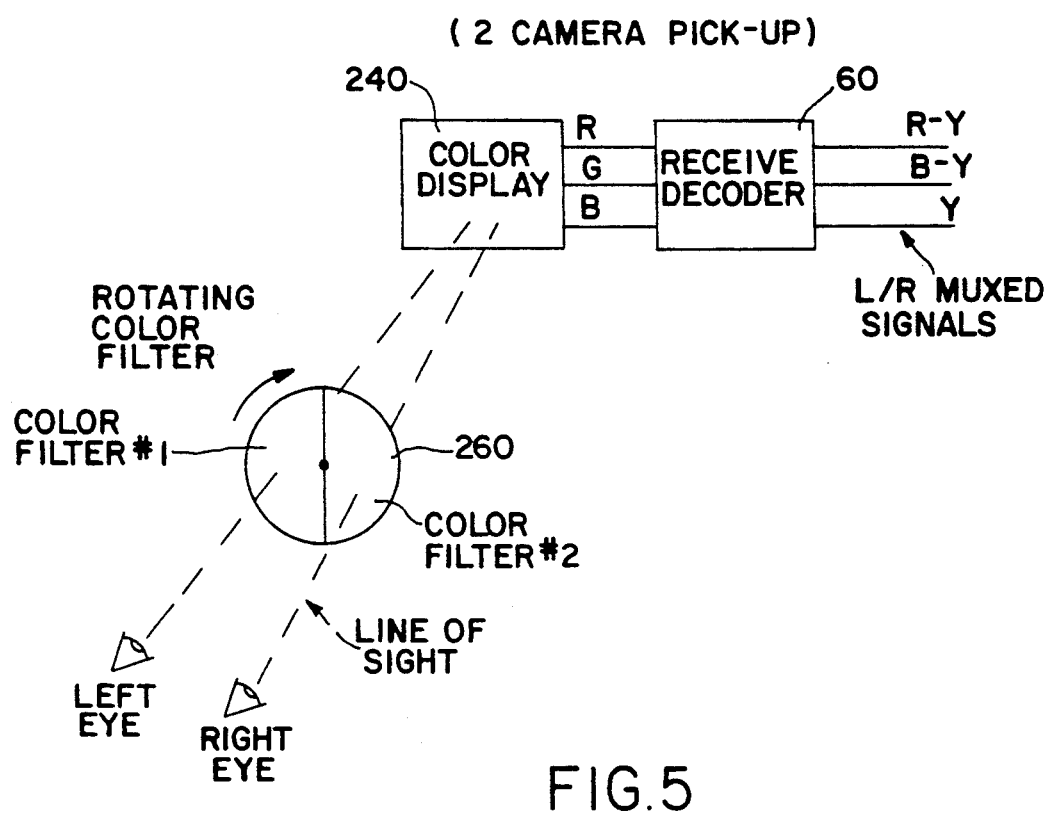
FIG. 5 is a block diagram of a fifth embodiment of a 3-dimensional color television system according to the present invention.

FIG. 5 illustrates an embodiment similar to the FIG. 3 embodiment, except that a rotating color wheel 260 is used as the demultiplexer to mechanically perform the left/right demultiplexing. The display 240 receives the red, green and blue color signals directly from the receive decoder 60. A multiplexed image displayed by display 240 and is viewed through rotating color filter 260. As with the FIG. 3 color filter, the rotating color filter (color wheel) 260 is divided in half, having two different colors (e.g. green and magenta) on its opposite sides. By use of rotating color filter 260, the viewer continuously sees a left and right image in each eye, with alternating colors. The color filter is run by motor (not shown), which is synchronized with the vertical sync of the received video signal.

Figure 6:
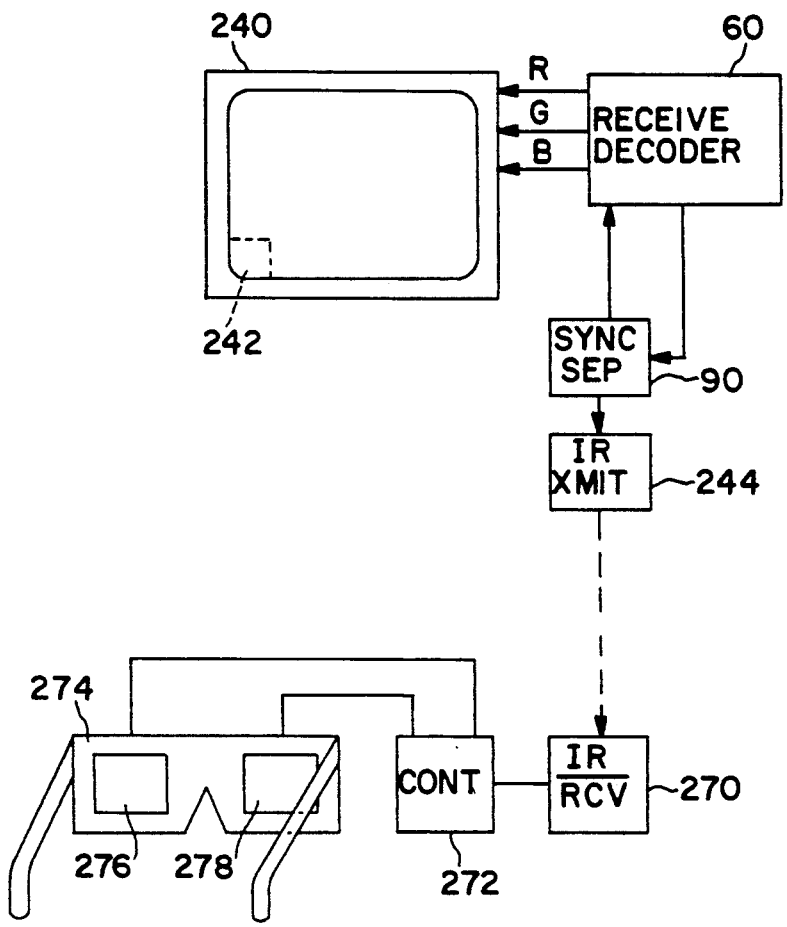
FIGS. 6 and 6a are block diagrams, partly in perspective drawing form, of a modified viewing system suitable for use with the embodiment of the invention shown in FIG. 5.

Another, similar embodiment is shown in FIG. 6. The major difference between this embodiment and that shown in FIG. 5 is the addition of glasses 274 which perform the color demultiplexing function responsive to a frame-rate signal provided by the sync separator 90. The lenses 276 and 278 of the glasses 274, which are described in detail below, alternately act as green or magenta optical filters during successive field intervals of the displayed video signal, responsive to signals provided by a controller 272. In the exemplary embodiment of the invention, the left lens 276 of the glasses alternately passes green and magenta light while the right lens alternately passes magenta and green light, respectively.

Figure 6A:
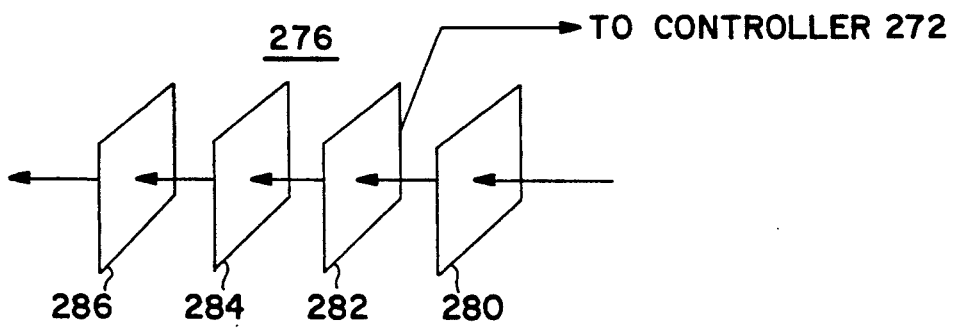

FIG. 6a is a blown-up perspective drawing of an exemplary lens 276. The lens includes four elements, a linear polarizer 280, a twisted nematic liquid crystal device 282 and two color polarizers 284 and 286. The linear polarizer 280 converts the unpolarized light provided by the CRT 240 into, for example, horizontally polarized light. The liquid crystal device 282 is controlled by the controller 272 to either pass the horizontally polarized light or to twist the light to be vertically polarized. The color polarizer 284 passes polychromatic horizontally polarized light but only passes the green components of vertically polarized light. The color polarizer 286, on the other hand, passes polychromatic vertically polarized light but only the red and blue (magenta) components of horizontally polarized light. Thus, by switching the liquid crystal device 282 at the field rate, the controller 272 can cause the lens 276 to pass green light in one field and red and blue light in the next field. Devices suitable for use as color polarizers 286 and 284 are well known to amateur photographers and are commercially available.

The lens 278 is of a similar construction except that its liquid crystal device is controlled to provide vertically polarized light while the liquid crystal device 282 is providing horizontally polarized light and vice versa. Switched color polarizing filters of this type are described in a paper by A. N. Brinson et al. entitled LIQUID CRYSTAL APPARATUS FOR CONVERTING BLACK AND WHITE CRT DISPLAY INTO COLORED DISPLAY, *IBM technical Disclosure Bulletin*, Vol. 22, No. 5, Oct. 1979, which is hereby incorporated by reference for its teachings on switched optical color filters.

It is contemplated that the IR receiver 270, and the controller 272 may be implemented as circuitry within the frames and temples of the glasses 274.

As an alternative to the sync separator 90 directly driving the infrared transmitter 244, the image produced on the CRT 240 may include an area 242 which changes in luminance from field to field so that, for example, the area is relatively dark for odd fields and relatively bright for even fields. An IR transmitter (not shown) having a photocell input may be placed in front of the area 242 to send the control signals to the glasses 274.

All of the above-described embodiments overcome the flickering problem of prior art 3-dimensional television systems by avoiding the situation in which only one of the two images (left or right images) is viewed at a time. Instead, the viewer constantly views both left and right image simultaneously, with the color separated images being alternated.

The features and advantages of the invention are apparent from the detailed specifications. Thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modification and equivalents may be resorted to, falling within the scope of the invention.

The invention claimed is:

1. A three-dimensional television system comprising:
    pick-up means for receiving separate left and right images of an object or scene and for generating at least first and second color signals representing respective first and second color components for said each of said left and right images;
    multiplexing and encoding means for alternately combining respectively different ones of the first and second color signals generated from said respective first and second color images during successive field intervals of said first and second color signals to generate a single multiplexed image signal;

transmission means for transmitting said multiplexed image signal;

receiving means for receiving said transmitted signal and for separating the first and second color signals from said received signal;

display means for displaying the separated first and second color signals; and control means for controlling the display of the separated first and second color signals so that a viewer simultaneously views images produced from respectively different color signals for each of said respective left and right images, which first and second color images alternate from field to field for each of said left and right images, wherein the left and right images are viewed substantially exclusively by the respective left and right eyes of a viewer.

2. A three dimensional television system as set forth in claim 1 wherein said first and second color components of said left and right images are green and magenta, respectively.

3. A three dimensional television system as set forth in claim 1 wherein said transmission means includes means for generating a composite video signal which includes said combined first and second color signals.

4. A three-dimensional television system as set forth in claim 1, wherein said pick-up means comprises separation means for receiving spatially separated left and right views of said object or scene and wherein said display means comprises means for converging the spatially separated views into a single multiplexed image.

5. A three-dimensional television system as set forth in claim 4, wherein said pick-up means includes first and second television cameras configured to receive said respective left and right views.

6. A three-dimensional television system as set forth in claim 4, wherein said pick-up means includes:
a single television camera configured to simultaneously receive said left and right views as spatially separated images; and
means, coupled to said camera, for processing the signals provided thereby to generate first and second signals representing, respectively, said left and right images, each of said left and right images being represented by first and second color signals.

7. A three-dimensional television system as set forth in claim 4, wherein said display means includes:
first and second television display devices configured to display said respective left and right views; and
optical means for converging said displayed left and right images to produce a single stereoscopic image.

8. A three-dimensional television system as set forth in claim 4, wherein said display means includes:
a television display device configured to display a multiplexed video image produced by said multiplexed image signal; and
optical means for producing a single stereoscopic image from said displayed multiplexed image.

9. A three-dimensional television system as set froth in claim 8 wherein:
said optical means includes at least left and right controlled optical filters positioned between the viewer and the television display device; and
said control means includes means for controlling each of said left and right optical filters to alternately pass respectively different ones of said first and second color components during successive ones of said field intervals.

10. A three-dimensional television system as set forth in claim 4, wherein said display means includes:
a television display device configured to display left and right spatially separated video images on a single video screen; and
optical means for producing a single stereoscopic image from said spatially separated displayed video images.

11. A there-dimensional video display system comprising:
means for generating signals representing at least first and second color signal components of spatially separated left and right views of a scene;
means for successively combining the first color signal components of the left view with the second color signal component of the right view and the second color signal component of the left view with the first color signal component of the right view to generate a single multiplexed video signal;
means for generating a video display from said multiplexed video signal; and
means for generating a single stereoscopic image, including left and right component images, from said video display, wherein the left component of said stereoscopic image alternately displays the first and second color signal components while the right component image alternately displays the second and first color signal components, respectively.

12. A method of generating a three-dimensional video display of an object or scene comprising the steps of:
separately scanning left and right images of the object or scene during successive field intervals to generate respective left and right image signals;
transmitting components of each of said left and right image signals during each field interval to a receiving means;
color separating each of said left and right image signals into first and second mutually exclusive color sets; and
displaying a single multiplexed image comprising said left and right images superimposed on each other, whereby during odd numbered field intervals the displayed left image includes only colors of said first set and the right displayed image includes only colors of said second set, and during even numbered field intervals, the left displayed image includes only colors of said second set, and the right displayed image includes only colors of said first set.

13. A three-dimensional television system comprising:
pick-up means, including separation means for receiving spatially separated left and right views of said object or scene, for generating at least first and second color signals representing respective first and second color components for said each of said left and right views;
multiplexing and encoding means for alternately combining respectively different ones of the first and second color signals generated from said respective first and second color images during successive field intervals of said first and second color signals to generate a single multiplexed image signal;

transmission means for transmitting said multiplexed image signal;
receiving means first receiving said transmitted signal and for separating the first and second color signals from said received signal;
display means including:
- a television display device for displaying the separated first and second color signals as spatially separated images and
- optical means, including a rotating color wheel positioned between the viewer and the television display device to converge said spatially separated images into a single multiplexed image;

control means for controlling the display of the separated first and second color signals so that a viewer simultaneously views images produced from respectively different color signals for each of said respective left and right images, which first and second color images alternate from field to field for each of said left and right images, wherein the left and right images are viewed substantially exclusively by the respective left and right eyes of a viewer, said control means including means for controlling the rotation of said color wheel to alternately pass respectively different ones of said first and second color components during successive ones of said field intervals to each of the left and right eyes of the viewer.

* * * * *